Nov. 13, 1951 E. L. BAUGH 2,574,613
FLUID PUMP PRESSURE LIMITING VALVE

Filed March 3, 1949 2 SHEETS—SHEET 1

INVENTOR
EVERETT L. BAUGH

BY Spencer, Hardman and Felker
HIS ATTORNEYS

Nov. 13, 1951 — E. L. BAUGH — 2,574,613
FLUID PUMP PRESSURE LIMITING VALVE
Filed March 3, 1949 — 2 SHEETS—SHEET 2
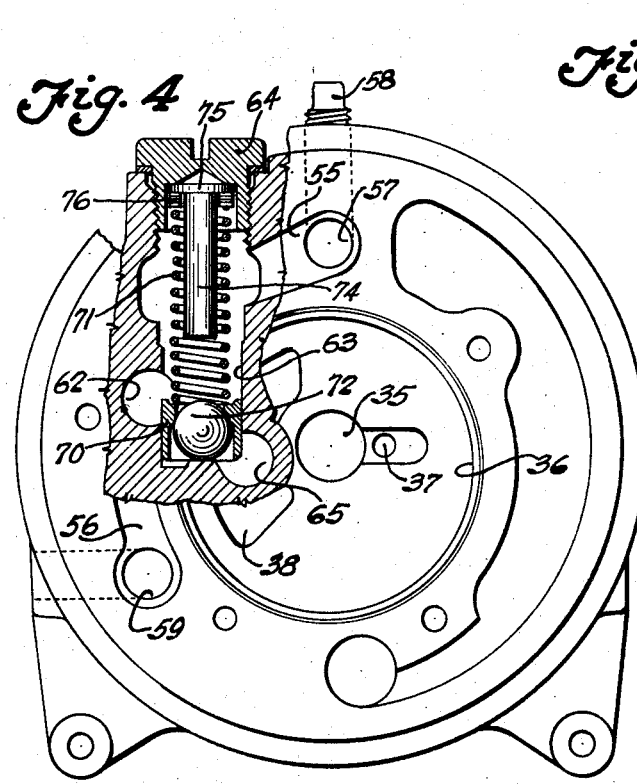
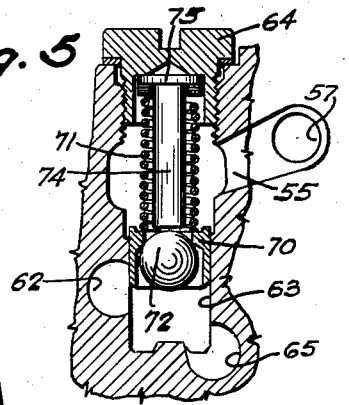
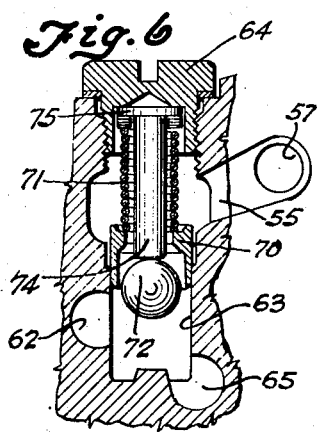
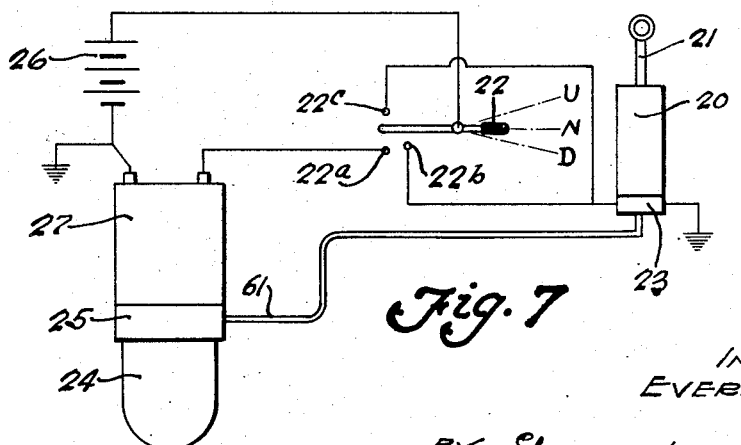
INVENTOR
EVERETT L. BAUGH
BY Spencer, Hardman and Fehr
HIS ATTORNEYS Patented Nov. 13, 1951

2,574,613

UNITED STATES PATENT OFFICE 2,574,613

FLUID PUMP PRESSURE LIMITING VALVE

Everett L. Baugh, Dayton, Ohio, assignor to General Motors Corporation, Detroit, Mich., a corporation of Delaware Application March 3, 1949, Serial No. 79,398

8 Claims. (Cl. 103—42)

1

This invention relates to improvements in fluid pumps.

It is among the objects of the present invention to provide a fluid pump capable of having an electric motor attached to one side thereof for motive power and a tank attached to another side thereof for containing the fluid supply, the entire assembly providing a compact unit requiring minimum space.

A further object of the present invention is to provide a fluid pump with a contained composite fluid flow control valve consisting of two members which are urged together by fluid pressure to prevent fluid flow past said valve until it has been moved into a predetermined position at which point said two members are separated to provide fluid passage directly through the valve.

Further objects and advantages of the present invention will be apparent from the following description, reference being had to the accompanying drawings, wherein a preferred embodiment of the present invention is clearly shown.

In the drawings:

Fig. 4 is a top plan view of the pump a portion of which is shown in section to disclose the fluid flow control valve. The fluid displacement mechanism shown in Fig. 2, is omitted in Fig. 4 for the sake of clearness.

Fig. 5 is a fragmentary sectional view of the fluid flow control mechanism in a position differing from that of Fig. 4.

Fig. 6 is a view similar to Fig. 5, however, showing the composite valve element separated to permit fluid flow therethrough.

Fig. 7 is a diagrammatic view showing the unit of Fig. 1 connected to its cooperating electrical and fluid actuated devices.

Figure 1:
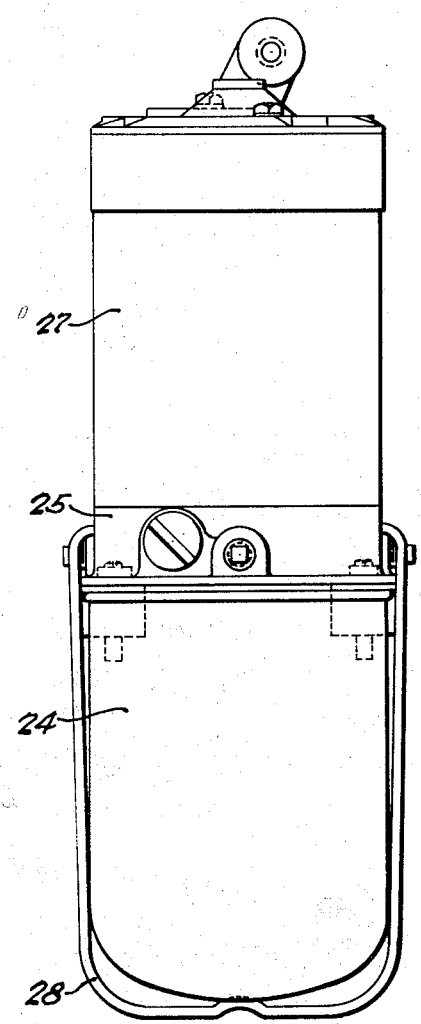
Fig. 1 illustrates the fluid pump assembled between an electric motor and a fluid supply tank.

The pump of the present invention, with its associate electric motor and fluid supply tank is adapted to be used for actuating automobile top and window operating devices. For purposes of illustration the diagrammatic Fig. 7 shows an operating device in the form of a cylinder 20 having a piston and a rod 21, said rod being connectible to an automobile window for raising and lowering it.

A control switch has a lever 22 shown in its normal "off" position marked "N" in Fig. 7. This lever 22 is movable into the position marked "U"

2 when it is desired to raise the window and into the position marked "D" when the window is to be lowered. In its "U" position, lever 22 connects the storage battery 26 with the two terminals 22a and 22b which are respectively connected to the electric motor 27 and then normally closed, electromagnetically actuated valve 23 secured to the bottom of cylinder 20. When motor 27 is rendered active it drives the pump 25 which delivers fluid under pressure from tank 24 through pipe 61 and the now open valve 23 into the cylinder 20, raising the piston and its rod 21 and consequently the window attached to said rod. When the window is raised to the desired up position, lever 22 is returned to its position "N," thereby disconnecting the pump 27 and valve 23 from the battery 27. The pump is now inactive and the valve 23 returns to its normally closed position thereby preventing fluid from passing from the cylinder 20 in response to the action of a spring (not shown) which constantly urges the piston and its rod 21 downwardly into the cylinder 20.

However, when it is desired to lower the window, lever 22 is moved into its "D" position connecting terminal 22c with the battery and thus again energizing the valve 23. Now the valve is opened and the piston in cylinder 20 will move downwardly under the effect of the spring engaging it causing fluid to be ejected from the cylinder 20 through pipe 61 and pump 25 into the fluid supply tank 24. As soon as lever 22 is moved into its "N" position the valve 23 is again deenergized and returns to closed position thereby stopping fluid ejection from the cylinder 20 and consequently holding the window attached to rod 21 stationary.

Thus to raise the window lever 22 is moved into its "U" position. To stop the window raising operation lever 22 is moved into its "N" position and to lower the window said lever is moved into its "D" position, the lowering operation ceasing when said lever 22 is again returned to its "N" position.

Figs. 1 and 7 illustrate the unitary structure consisting of the reservoir 24, the pump 25 and the electric motor 27 which drives the pump. The pump housing has the reservoir tank 24 attached to its bottom surface by the bail 28. The electric motor 27 is secured to the upper surface of the pump housing by suitable bolts, not shown. Thus this assembly provides a compact unit which, if desired, may be of such size and proportions as to be mounted in the automobile in close proximity to the work cylinder 20 it is adapted to render active, thereby eliminating the necessity of stringing long fluid conductors throughout the body of the automobile as is the case where one pump, tank and motor unit is used to provide power for all actuated devices.

Figure 2:
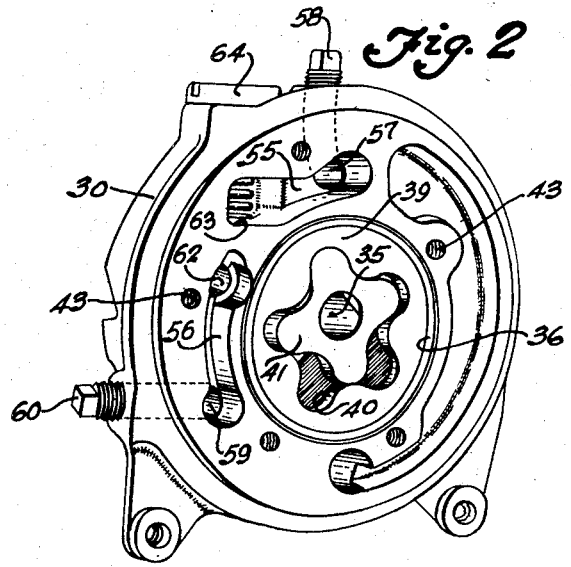
Fig. 2 is a perspective view of one side of the fluid pump with the cover plate removed.
Figure 3:
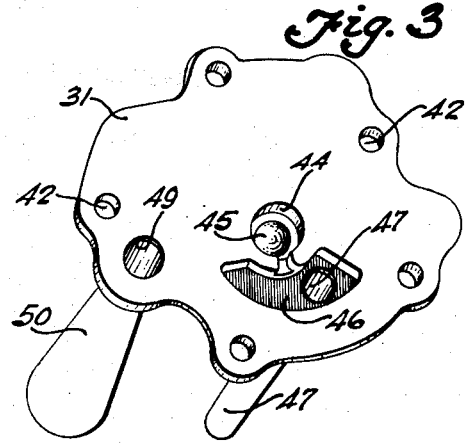
Fig. 3 is a perspective view of the removal cover plate.

As shown in Figs. 2 and 3, the pump housing consists of two portions, 30, the main body portion and 31 the cover cap. The bottom end surface of portion 30 to which the cover cap 31 and tank 24 are attached, is provided with a series of recesses as shown in Fig. 2. A central through passage or opening 35 is coaxial of the disc shaped body portion 30 and provides a bearing for the armature or rotor shaft of motor 27 which extends into a circular recess 36 in body portion 30, said recess being eccentric to the central opening 35 (see Fig. 4). A duct 37 leads from the inner surface of the recess 36 to a ball bearing (not shown) provided in opening 35 for the rotor shaft. Another opening in said recess surface provides the outlet port 38 for the pump.

Recess 36 forms what may be termed the "cylinder" of the pump and contains the fluid displacement mechanism consisting of the disc 39 rotatably fitting into said cylinder and having a rounded corner, star shaped opening 40 therein in which the pump rotor 41 rotates. Fig. 2 shows the opening 40 as having five equally spaced, inwardly extending rounded nodules while the rotor 41 has four equally spaced, outwardly extending rounded nodules.

Cover cap 31 is secured to the pump housing 30 by screws extending through holes 42 in the cap and threadedly received through holes 43 in the housing. An opening or recess 44 in the cap contains a ball bearing 45 which is engaged by the end of the armature shaft extending through the housing and provides an end thrust bearing for said shaft. Rotor 41 is attached to the armature shaft of the motor in any suitable manner so as to rotate therewith when the motor 27 is energized and rendered active. An arcuate recess 46 in the surface of cap 31 fitting upon the pump housing forms the intake port of the fluid displacement mechanism of the pump. A hole through the cap, communicating with recess 46, has one end of a pipe 47 secured therein the other end of said pipe extending into tank 24 and terminating near its bottom. Another hole 49 through cap 31 has one end of pipe 50 secured therein, this pipe 50 also extending close to the bottom of said tank. This pipe 50, however, gradually increases in diameter from its point of attachment to the cap to its bottom end as shown in Fig. 3. This avoids turbulence of the fluid as it is discharged from the pump back into the reservoir as will later be explained.

Figs. 2 and 4 show the surface of the pump housing 30, engaged by cover cap 31, provided with two recesses 55 and 56. Recess 55 has a hole 57 connecting with a passage in the housing into which plug 58 is screwed. At the one end of recess 56 a hole 59 connects with a passage in which plug 60 is screwed as shown in Fig. 2. When the pump is installed the pipe 61 of Fig. 7 is screwed into the pump housing instead of plug 60. Another hole 62 at the opposite end of recess 56 connects said recess with a recess 63 one end of which is open and interiorly threaded to receive the screw plug 64. As shown in the fragmentary sectional views Figs. 4, 5 and 6, recess 63 not only communicates with the hole or discharge port 62 but also communicates with the hole 65 leading from the outlet port 38 and with the recess 55 which forms the pressure relief port communicating with the hole 49 and its pipe 50 in the attached cover cap. Thus it can be seen that the outlet port 38, the discharge port 62 and the relief port 55 are interconnected by the recess 63.

A valve mechanism normally shuts off communication between the fluid displacement mechanism, its outlet port 38 and the discharge port 62 while in no way affecting the communication between the discharge port 62 and relief port 55 via the recess 63. This permits the return of fluid from the work cylinder 20, pipe 61 when lever 23 is in "D" position, recess 56, discharge port 62, recess 63, relief port 55 and into the reservoir tank via hole 49 and pipe 50 on the cover cap 31. This valve mechanism consists of a sleeve 70 slidably fitting within the recess 63. A spring 71 engages and yieldably urges said sleeve toward the bottom of recess 63. An inner, annular shoulder within sleeve 70 forms a seat for the ball-check 72, which, resting upon the bottom of recess 63, is engaged normally by the seat in sleeve 70 under the influence of spring 71 (see Fig. 4). Thus this composite valve consisting of sleeve 70 and ball-check 72 normally shuts off communication between the outlet port 38—65 and the discharge port 62. An abutment pin 74 has an enlarged head 75 seated in a recess in screw-plug 64 so as to maintain the pin 74 concentric of the recess 63. The diameter of pin 74 is less than the inside diameter of sleeve 70 at its inner, annular shoulder. The head of pin 74 is maintained in the recess of screw plug 64 by spring 71 which abuts against said head. To vary the normal pressure of spring 71 upon sleeve 70 shim rings 76 are placed on the pin 74 between the spring end and head 75.

Fig. 4 shows the composite valve mechanism in the normal position, that is, when the pump is inactive. It will be noted that the discharge port 62 is in communication with the fluid pressure relief port 55 by way of the recess 63. Under these conditions fluid may flow from the work cylinder 20, through pipe 61, hole 59, recess 56, hole or discharge port 62, recess 63, relief port or recess 55, hole 49 and pipe 50 in cover cap 31 into reservoir tank 24 when control valve lever 23 is moved into its "D" position for lowering the window. However, when lever 23 is moved into its normal "N" position, pipe 61 is closed and no more fluid may flow from the work cylinder 20 so that rod 21 is held immovable.

When the lever 23 is actuated into the position marked "U" the electrical circuit including the storage battery 26 and the electric motor 27 is closed and the electric motor is rendered active to drive the pump. As the rotor 41 of the pump is rotated fluid is drawn from the reservoir tank 24, through pipe 47 and the fluid displacement mechanism including rotor 41 and cooperating disc 39 will force the fluid, under pressure, into the outlet port 38 of the pump. From this outlet port 38 the fluid is forced through the communicating hole or opening 65 against the ball 72 and its engaging sleeve 70. Increasing fluid pressure will increasingly urge the ball 72 upon its seat in the sleeve 70 and when said fluid pressure is sufficient to overcome the effect of spring 71 to hold the composite valve in its normal position, said valve, including the ball and sleeve, will move as a solid member toward the pin 74. During its upward movement sleeve 70 will first cover the discharge port or opening 62 shutting off its communication with the recess 63 and the relief port 55.

As the composite valve continues to move upwardly toward pin 14, its two members, ball-check 72 and sleeve 70 are pressed together in tighter engagement by the increasing fluid pressure and thus move as a solid mass. When reaching the position as shown in Fig. 5, said composite valve will have uncovered the discharge port or opening 62 and completed communication between said discharge port and the outlet port 38 of the pump. Communication between the discharge port 62 and the relief port 55 is, however, still discontinued as shown in Fig. 5. Now the fluid, delivered under pressure from the pump outlet port 38 flows from opening 65 through recess 63 into the discharge port or opening 62, continues through recess 56, opening 59 and pipe 61 to the work cylinder 20, causing the piston and its rod 21 to be moved for actuating the window upwardly.

If the window reaches its extreme upward position or something interferes with its normal upward movement and the lever 23 is still held in its "U" position to maintain the electric motor active to drive the pump, its fluid delivery pressure will increase causing a continued upward movement of the composite valve from the position as shown in Fig. 5. As the composite valve moves upwardly from the position, the ball-check member 72 thereof will engage the stationary abutment pin 74 and consequently further upward movement of ball-check 72 is prevented. However, movement of the sleeve member 70 of the composite valve is in no way impeded by the pin for said pin is concentric of the sleeve and of less diameter than the sleeve's smallest inside diameter. Therefore, fluid pressure acting against the sleeve will continue to move it upwardly against the effect of the spring 71 and thus cause separation of the sleeve 70 and the ball-check 72 as shown in Fig. 6. Now communication between the outlet port 38 of of the pump and the fluid pressure relief port 55 is established and fluid delivered by the pump will circulate from its outlet port 38, through opening 65 into recess 63, pass through the space between the ball-check 72 and sleeve 70 through the relief port 55, opening 49 and pipe 50 into the reservoir tank 24. When operation of the pump ceases, spring 71 will return the composite valve mechanism to its normal position as shown in Fig. 4.

The present invention thus provides a fluid pump having a fluid flow control mechanism of simple structure and design. This fluid flow control mechanism consists of a composite valve comprising two members urged together and caused to move as a solid mass under the influence of increasing fluid pressure and positively separated to establish a fluid pressure relief circuit when, in response to a predetermined, high fluid pressure, said composite valve is moved into a certain position in its range of movement.

While the embodiment of the present invention as herein disclosed, constitutes a preferred form, it is to be understood that other forms might be adopted.

What is claimed is as follows:

1. A fluid pump having fluid displacement mechanism provided with an outlet port; a discharge port; a pressure relief port; a duct providing communication between all of said ports; and fluid flow control apparatus yieldably urged normally to shut off communication between the fluid displacement mechanism and the discharge and pressure relief ports without affecting the communication between the discharge and pressure relief ports, said apparatus being operative at a predetermined fluid pressure, successively to discontinue the communication between said discharge and pressure relief ports and then open communication between the fluid displacement mechanism and the discharge port, said apparatus being operative at pressures in excess of said predetermined fluid pressure to open communication between the displacement mechanism and the pressure relief port.

2. A fluid pump having fluid displacement mechanism; an outlet port; a fluid discharge port; a fluid pressure relief port; a duct connecting said outlet port with the discharge and fluid pressure relief ports; and spring loaded valve apparatus in said duct, normally closing the port to shut off communication between the displacement mechanism and the discharge port without affecting the communication between the discharge and pressure relief ports, said valve apparatus being movable by a predetermined fluid pressure first to discontinue communication between the discharge and pressure relief ports, then to open communication between the displacement mechanism and the discharge port, said valve apparatus being operative at a fluid pressure in excess of said predetermined pressure to open communication between the displacement mechanism and the pressure relief port.

3. A fluid pump in accordance with claim 2 in which the spring loaded valve apparatus consists of a composite, two piece valve normally urged together by fluid pressure in the displacement mechanism to form a solid closure member for the outlet passage, and a stationary abutment engageable by the one piece of the valve to permit relative movement of the spring engaged other piece in response to excessive fluid pressure in the displacement mechanism whereby communication between said mechanism and the pressure relief port is established by the separation of the two valve pieces.

4. A pump comprising in combination, fluid displacement mechanism connectible to a source of fluid; an outlet port; a fluid pressure relief port; a fluid passage interconnecting the outlet port, the relief port and the displacement mechanism; a composite valve yieldably urged normally to shut off communication between the displacement mechanism and said two ports, the members of said composite valve being urged together and caused to move as a solid body under the influence of fluid discharged under pressure from said displacement mechanism, for closing communication between the two ports and opening communication between the displacement mechanism and the outlet port; and means engageable by one member of the valve when said valve is moved into a predetermined position, said means being operative to effect separation of the members of the composite valve and thereby open communication between the fluid displacement mechanism and the relief port.

5. A fluid pump having fluid displacement mechanism provided with fluid intake and outlet ports; a discharge port; a fluid pressure relief port; a passage interconnecting the outlet, the discharge and the relief ports; fluid flow control apparatus in said passage, normally shutting off communication between the outlet port and the discharge and relief ports, said apparatus consisting of an apertured plug, a spring yieldably maintaining said plug in its normal position, a ball fitting into the aperture of the plug on its side adjacent the outlet port, said ball closing the aperture and being urged upon the plug by fluid pressure from the outlet port causing the plug and ball to move as a unit first to close communication between the discharge and relief ports and then to open communication between the outlet port and discharge port; and a fixed abutment member engageable by the ball only when fluid pressure has moved the plug and ball into a predetermined position whereby continued fluid pressure will move the plug relatively to the ball to open communication between the outlet and relief ports through said plug.

6. A fluid pump having fluid displacement mechanism provided with fluid inlet duct and an outlet port; a discharge port; a fluid pressure relief port; a passage interconnecting all three of said ports; fluid flow control apparatus normally closing said passage to shut off communication between the outlet port and the discharge and relief ports, said apparatus consisting of a spring loaded collar providing an interior, annular ledge upon whose side, adjacent the outlet port, a ball check is urged by fluid pressure to close said collar, the fluid pressure, when attaining a predetermined valve, urging the collar and ball as a compact unit in the passage, to close communication between the discharge and relief ports and then open communication between the outlet and discharge ports; and an abutment pin extending into said passage so as to be engageable by said ball for causing the collar to move relatively to the ball and separate said collar and ball for establishing communication between the outlet and relief ports in response to fluid pressure predeterminately exceeding said predetermined pressure value.

7. A fluid pump having fluid displacement mechanism provided with fluid intake and outlet ports; a discharge port; a fluid pressure relief port; a passage interconnecting the outlet, discharge and relief ports; means consisting of two interfitting members in said passage, yieldably urged normally to shut off communication between said outlet port and the discharge and relief ports, said means being operative in response to fluid pressure delivered by the displacement mechanism through the outlet port first to close communication between the discharge and relief ports and then to open communication between the outlet and discharge ports; and rigid means engageable by one of the members of the first mentioned means for separating the two interfitting members and forming a passage therebetween, providing communication between the outlet and relief ports.

8. A pump unit having a body portion, a fluid reservoir suspended from said body portion, fluid displacement means carried by said body portion and provided with an inlet and an outlet for fluid, said body portion having a return port and interconnected passages respectively in communication with the displacement means, the inlet and outlet and the return port; two tubes for fluid transfer extending respectively from said inlet and return port toward and terminating adjacent the bottom of said reservoir, one tube constituting a fluid supply line from the reservoir to the fluid displacement means, the other of said tubes increasing in cross-sectional area as it approaches the outlet end, and constituting a return line to the reservoir from the return port, said pipe reducing the fluid velocity as it emerges from said pipe for minimizing the agitation of the fluid in the reservoir as fluid is discharged from the pipe, valve means normally urged to maintain communication between the outlet and return port and shut off communication between the displacement means and the outlet and return port, said valve means being operative at a predetermined fluid pressure to shut off communication between the outlet and return port and then to open communication between the displacement means and the outlet, and, at fluid pressure exceeding said predetermined pressure, to open communication between the displacement means and the return port.

EVERETT L. BAUGH.

REFERENCES CITED

The following references are of record in the file of this patent:

UNITED STATES PATENTS

| Number | Name | Date |
|---|---|---|
| 2,310,078 | Herman | Feb. 2, 1943 |
| 2,380,783 | Painter | July 31, 1945 |
| 2,405,061 | Shaw | July 30, 1946 |
| 2,434,135 | Witchger | Jan. 6, 1948 |